United States Patent [19]

Garvey

[11] Patent Number: 5,042,648
[45] Date of Patent: Aug. 27, 1991

[54] CRESCENT-TYPE CHAIN CONVEYOR

[75] Inventor: Francis J. Garvey, Blue Anchor, N.J.

[73] Assignee: Garvey Corporation, Blue Anchor, N.J.

[21] Appl. No.: 441,249

[22] Filed: Nov. 27, 1989

[51] Int. Cl.$^5$ .............................................. B65G 17/06
[52] U.S. Cl. .................................... 198/853; 198/833; 198/321
[58] Field of Search ............... 198/321, 328, 851, 853, 198/803.01

[56] References Cited

U.S. PATENT DOCUMENTS

| | | | |
|---|---|---|---|
| 1,757,652 | 5/1930 | Bethke | 198/853 |
| 1,800,663 | 4/1931 | Schade | 198/853 |
| 1,973,750 | 9/1934 | DeKay | 198/853 X |
| 2,150,610 | 3/1939 | Raffetto | 198/833 |
| 2,705,073 | 3/1955 | Muller | 198/851 X |
| 3,185,108 | 5/1965 | Muller | 198/321 |
| 3,317,030 | 5/1967 | Davis | 198/853 X |
| 3,379,300 | 4/1968 | Kass | 198/833 |
| 3,395,648 | 8/1968 | Kass et al. | 198/321 |
| 3,399,758 | 9/1968 | Kass | 198/321 X |
| 3,493,097 | 2/1970 | Kass | 198/321 X |
| 3,498,445 | 3/1970 | Piper | 198/321 X |
| 3,554,360 | 1/1971 | Bildsoe | 198/853 X |
| 3,595,377 | 7/1971 | McCoy et al. | 198/853 X |
| 3,685,637 | 8/1972 | Bildsoe | 198/853 X |

FOREIGN PATENT DOCUMENTS

| | | | |
|---|---|---|---|
| 1008491 | 5/1952 | France | 198/833 |
| 0846423 | 7/1981 | U.S.S.R. | 198/853 |

Primary Examiner—Robert P. Olszewski
Assistant Examiner—James R. Bidwell
Attorney, Agent, or Firm—Norman E. Lehrer; Franklyn Schoenberg

[57] ABSTRACT

A conveyor system is provided suitable for use over linear and curved paths of travel including sharp bends and turn-arounds which includes a conventional link-type chain, a plurality of separable article carrier members in adjacent orientation which are releasably connected to respective pivot joints of the link-type chain to form a train of consecutive article carrier members having a substantially continuous planar upper face, each of the article carrier members being constructed at is opposite ends to cooperate with the immediately adjacent carrier member, and a support associated with the train of consecutive article carrier members to guide the path of travel thereof.

7 Claims, 4 Drawing Sheets

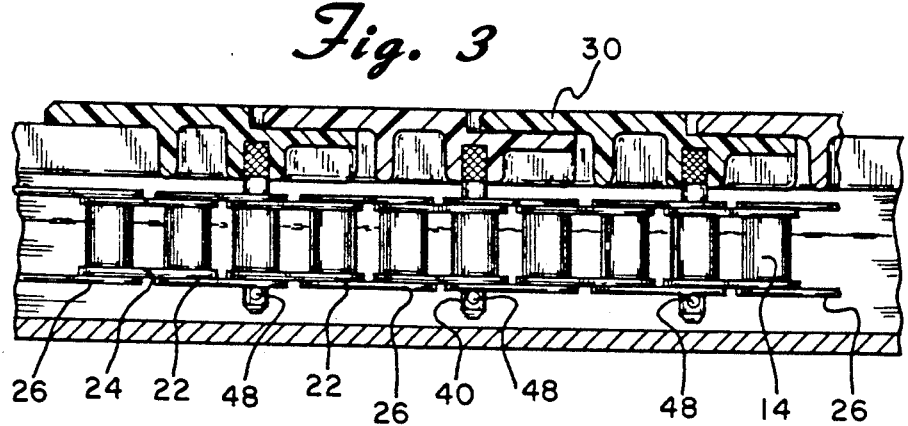
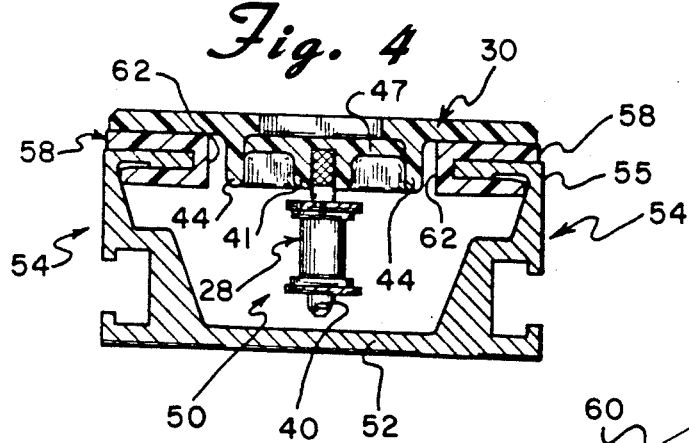
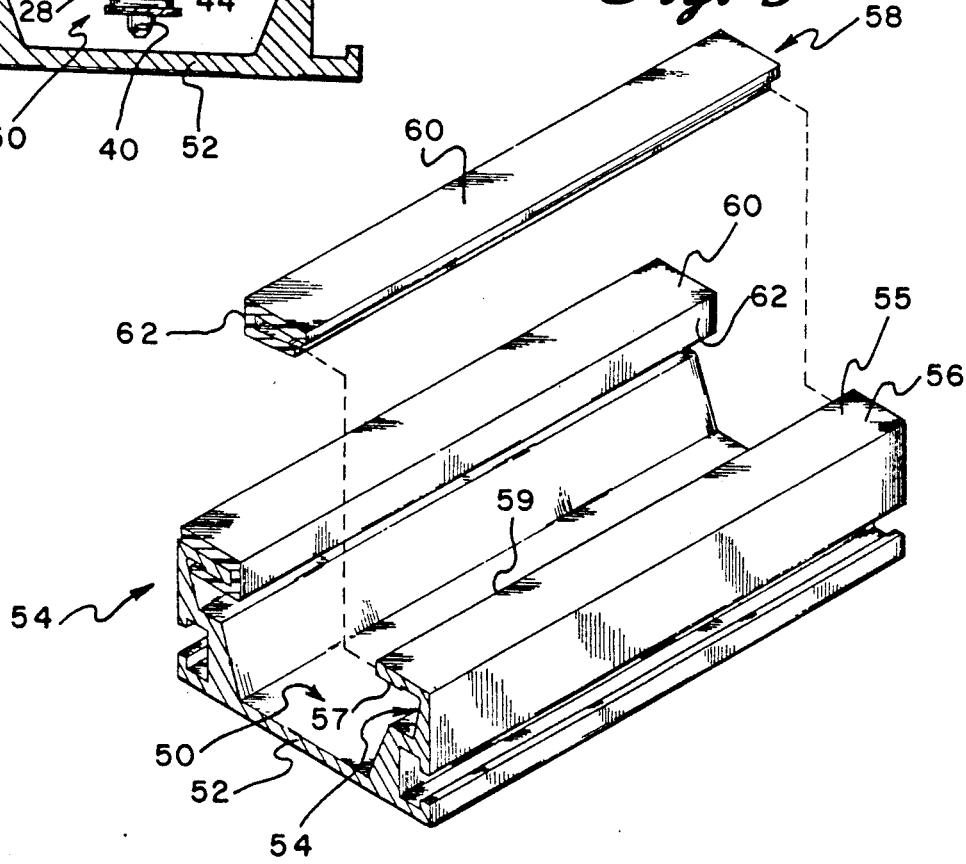

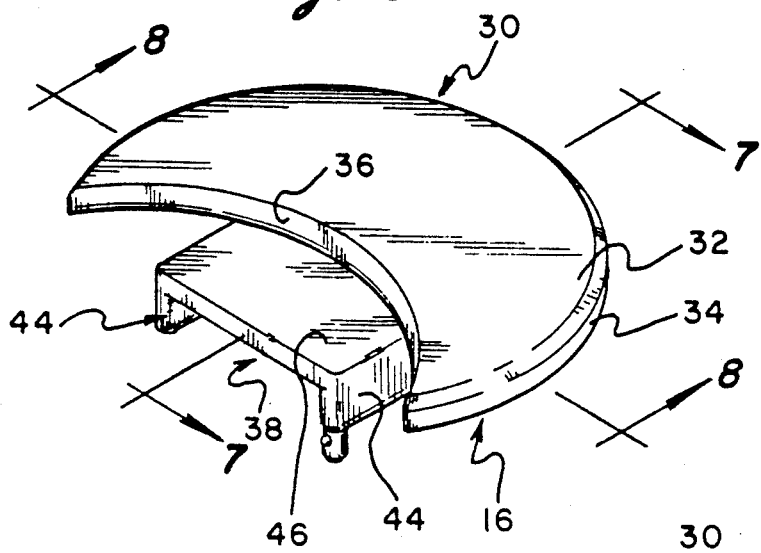
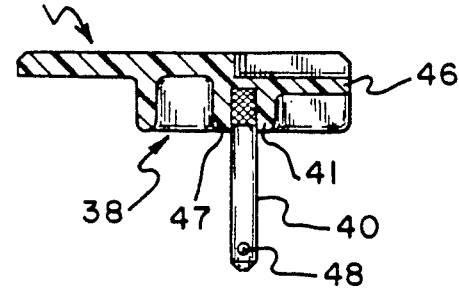
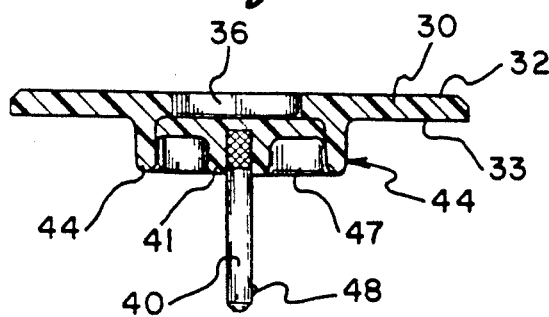
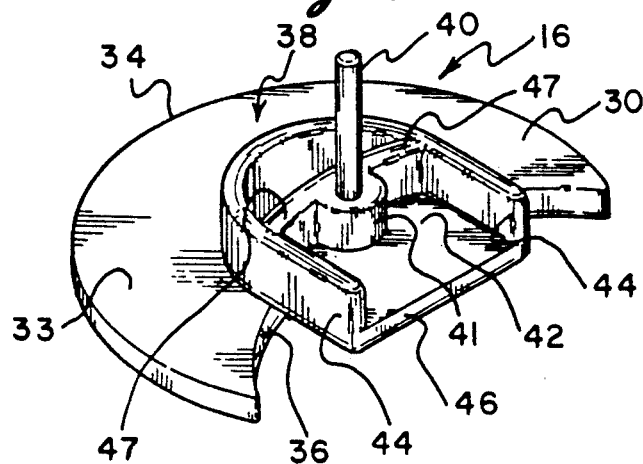

CRESCENT-TYPE CHAIN CONVEYOR

FIELD OF THE INVENTION

The present invention relates to conveyor apparatus and, more particularly, to improvements in endless chain-type conveyor systems for transporting a variety of articles along a pre-selected, non-linear (curved) path or course.

BACKGROUND OF THE INVENTION

Conveyor systems comprising a train of consecutive carrier elements movable generally along a linear and-/or curved pre-selected path or course and which may provide a forward and return motion, are widely used for a variety of applications, including the movement of articles and/or people. Various types of drive assemblies, carrier belts, and support elements are employed in such systems including belts, rollers, gears, chains, platens and the like or combinations of the same.

In conveyor systems with relative articulated or non-linear movement, it is common practice to employ endless chain conveyors with chain links pivotally secured together and platform members mounted thereon or chains of carrier members pivotally linked together which employ drive assemblies associated therewith, wherein the links articulate on transverse axes to enable the conveyors to bend and traverse about drive and idler sprockets with the same ease that they travel over the running axis. It is also known to use support structures for such conveyor systems which generally serve both to provide support for the chain of connected carrier elements, the conveyor drive assembly and/or combinations thereof as well as defining a preselected course for the conveyor system.

The conveyor flights typically employed with endless chain-type conveyor systems for supporting articles to be conveyed are plate or platform members formed with generally planar upper surfaces. To provide articulated-section conveyors adapted to follow linear and non-linear paths without opening gaps between adjacent article support members, there are described, for example, in U.S. Pat. No. 1,757,652, 1,800,663, 3,317,030, 3,554,360, and 3,685,637, the use of generally crescent-shape configured article support members which are adjacently oriented in the conveyor chain, and in U.S. Pat. Nos. 3,379,300, 3,399,758, 3,595,377, and 3,738,478 other configurations of generally contiguous support members which are suggested as useful in providing substantially continuous flights for conveyors moving along an irregular path.

There has been no capability described in prior constructions that, in general, permit the ready assembly and/or disassembly of the conveyors or separation of article support members from conventional conveyor drive chains, nor are such constructions suggested for conveyors particularly intended to follow articulating irregular paths of travel which may include sharp bends of short radius. Conveyor systems that may be conveniently and readily adapted for varying loads and conveyor paths of the closed loop-type such as spur conveyors where efficient use of space requires sharp turn-arounds and relatively small diameter drive sprockets, would be highly desirable.

SUMMARY OF THE INVENTION

It is an object of the present invention to provide an improved conveyor system having a generally uniplanar articulating flight which is adapted to operate on a substantially horizontal plane over linear and curved paths of travel including sharp bends of short radius and present a substantially continuous, flat, preferably unobstructed, upper support surface.

It is another object of the present invention to provide an improved endless conveyor chain having a generally uniplanar articulating flight which is adapted to follow with ease pre-selected linear and curved paths of travel including sharp bends of short radius and present a substantially flat, continuous upper article supporting surface.

It is yet another object of the present invention to provide an improved endless conveyor chain having an endless train of articulating crescent-shaped adjacently oriented members pivotally connected to a conventional power-drivable link chain to present a substantially continuous upper article support surface and which is adapted to follow with ease a pre-selected course including sharp bends of short radius.

It is a further object of the present invention to provide crescent-shaped members which can be releasably connected in adjacent orientation to a conventional link chain to present a substantially continuous articulatable conveyor flight which is adapted to follow with ease a pre-selected course including sharp bends of short radius.

It is a still further object of the invention to provide an improved support structure for an endless chain conveyor system.

In accordance with the present invention there is provided a conveyor system suitable for use over linear and curved paths of travel including sharp bends of short radius comprising:

a) a link-type chain adapted to articulate on transverse axes having pivot connecting means for interconnecting the links thereof and drive means associated therewith;

b) a plurality of separable article carrier members in adjacent orientation being releasably and pivotally interconnected with respective pivot connecting means of said link-type chain to form a train of consecutive article carrier members having a substantially continuous upper face, each of said carrier members having a substantially planar upper face with one edge thereof formed in a convex circular arc and an opposed edge formed in a concave circular arc, wherein the convex edge of one carrier member in said train is in contiguous relation to the concave edge of an adjacently oriented carrier member, said contiguous relation of adjacent carrier members and the substantially continuous upper face presented thereby being maintained while said train of carrier members follows a curved course; and c) means for supporting said carrier members to maintain the same in a substantially horizontal plane and for guiding the path of travel of said train of carrier members.

A further aspect of the invention provides a conveyor chain having a substantially continuous upper face which is adaptable to follow with ease a linear and curved path of travel including sharp bends of short radius comprising an endless train of a plurality of separable adjacently oriented load carrying members, preferably generally crescent-shaped members with a planar upper face, constructed at their opposite ends to cooperate with immediately adjacent load carrying members, pivotally and releasably interconnected with respective pivot joints of an endless link-type chain the links of which are pivotally interconnected, preferably with hollow pin connecting means, wherein said load carrying members are adapted to present a substantially continuous upper support surface while following linear and curved paths of travel.

A still further aspect of the invention provides a load carrier member suitable to be releasably interconnected with a link-type conveyor chain for a conveyor system adapted to convey a train of said carrier members along an irregular path or the like, said load carrier member having substantially planar platform means, preferably with its opposite ends constructed to cooperate with like carrier members used immediately adjacent thereto, guide means extending from one face of said platform means intermediate the ends thereof, and connecting means, preferably having retaining means in the distal end thereof, projecting substantially perpendicularly outwardly from the face of said platform means within the area defined by said guide means.

In accordance with the present invention, conveyors systems are provided using conventional link-type conveyor chains to which a plurality of carrier members, preferably having a crescent-shaped or the like upper faces, are pivotally interconnected in adjacent orientation, by virtue of which conveyor chains with substantially continuous, planar flights are readily adaptable for use in a variety of different conveyor systems with pre-selected conveyor paths, both linear and curved, which can include sharp turn-arounds and small diameter drive sprockets. Moreover, the carrier members of the invention can be readily installed on a conveyor chain, or easily removed therefrom for maintenance and replacement, when necessary.

Other objects, features and advantages will be readily apparent from the following detailed description of certain preferred embodiments thereof taken in conjunction with the drawing.

BRIEF DESCRIPTION OF THE DRAWINGS

For the purpose of illustrating the invention, there is shown in the accompanying drawing one embodiment which is presently preferred; it being understood that the invention is not intended to be limited to the precise arrangements and instrumentalities shown.

FIG. 3 is a sectional view taken along line 3—3 in FIG. 1;

FIG. 4 is an enlarged sectional view taken along line 4—4 in FIG. 1;

FIG. 5 is an exploded perspective view of a portion of the conveyor track shown in FIG. 1;

FIG. 6 is a perspective view of a load carrying member in accordance with the invention;

FIG. 7 is a sectional view taken along line 7—7 in FIG. 6;

FIG. 8 is a sectional view taken along line 8—8 in FIG. 6;

FIG. 9 is a bottom perspective view of the load carrying member shown in FIG. 6;

DETAILED DESCRIPTION OF THE INVENTION

Figure 1:
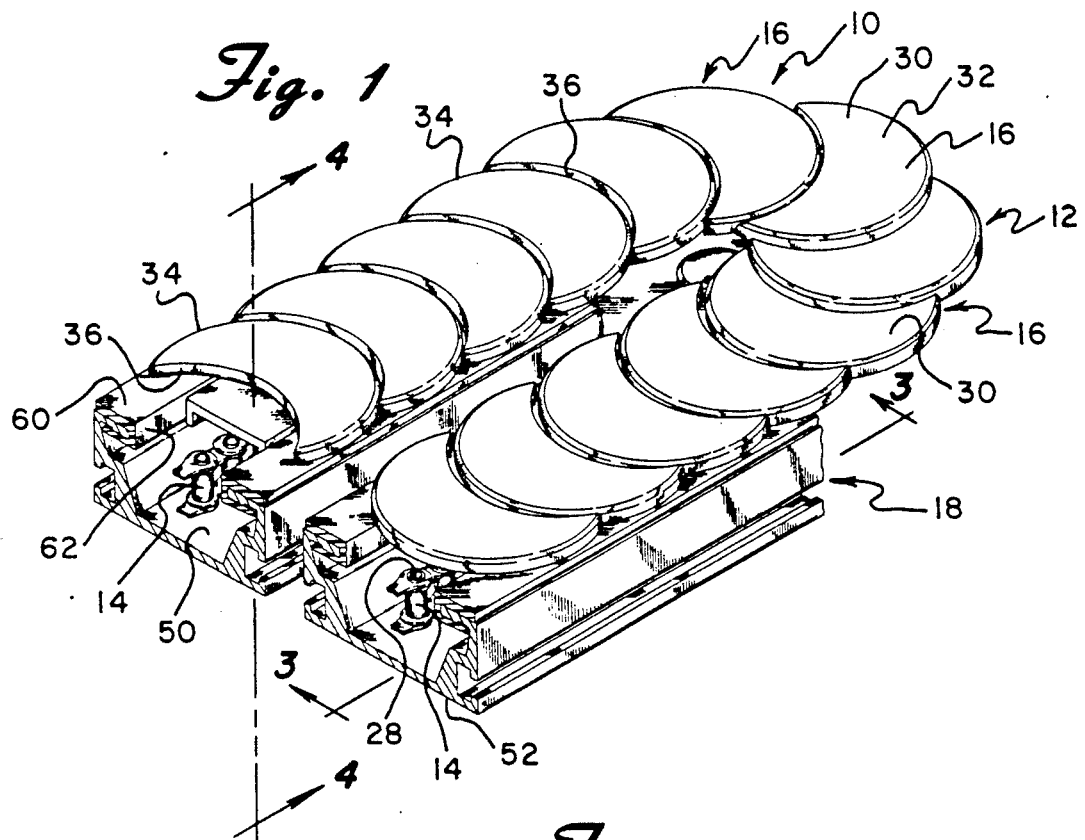
FIG. 1 is a perspective view, part broken away, of a portion of a conveyor system embodying the principles of the present invention.
Figure 2:
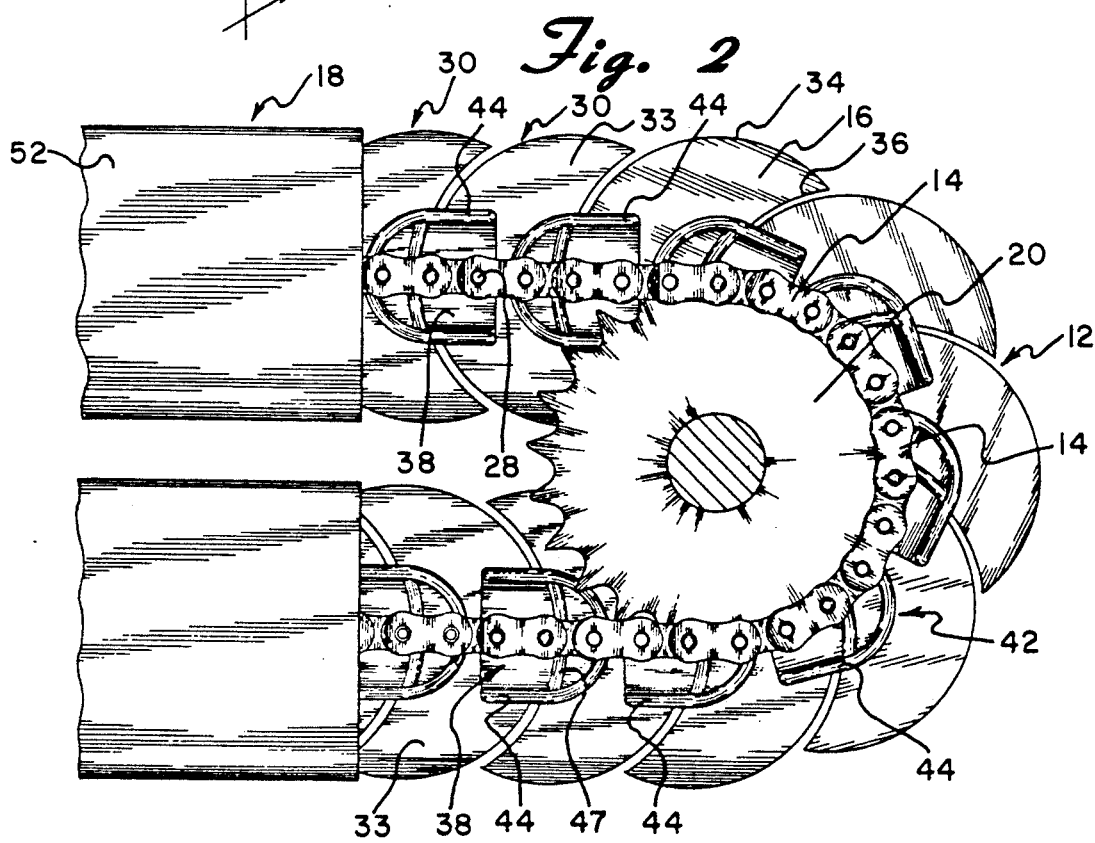
FIG. 2 is a enlarged bottom view of a portion of the conveyor shown in FIG. 1.

Referring now to the drawing, where like reference numerals identify like parts, there is illustrated in FIGS. 1-5 a conveyor system in accordance with the invention shown generally as 10, which includes a conveyor chain 12 formed with a link-type drive chain 14 having a plurality of adjacently oriented article carrier members 16 pivotally interconnected therewith associated with one or more drive sprockets 20 or the like rotating in a horizontal plane adapted to impart longitudinal movement to the conveyor chain 12. The conveyor chain 12 and sprocket or sprockets 20 are supported and the conveyor chain 12 is guided for movement or travel along a pre-selected path by an associated support structure, generally designated 18, having one or more drive assemblies (not shown) operatively associated therewith. The structure 18 is adapted to guide the conveyor chain 12 for movement in a substantially horizontal plane along both linear and curved paths of travel in accordance with any operational environment. By virtue of the fact that the support structure 18 and conveyor chain 12 are substantially identical in construction and operation throughout the entire length of the conveyor system 10, only a typical cross-section thereof is illustrated in the drawings and described herein, it being apparent that the description of said typical section will be applicable to the entire length of the conveyor system 10.

The conveyor chain 12 of the invention is uniquely constructed to be suitable for systems intended to follow articulating irregular paths of travel which may include sharp bends and turn-arounds and drive sprockets of small diameter as well as being adapted for ready installation and maintenance. The conveyor chain 12 comprises a typical, preferably endless, link-type chain 14 having a train of upper and lower inner links 24 and upper and lower outer links 26 pivotally interconnected at generally uniformly spaced pivot points 22 by hollow pin rollerless or the like link connecting means 28 to articulate about transverse axes enabling the chain to be driven about end sprocket(s) 20 with ease, and an upper, substantially continuous flight formed with a plurality of adjacently oriented article carrier members 16 pivotally and releasably mounted on the link-type chain 14 at respective pivot joints 22 thereof.

Each of the article carrier members 16 as will be hereinafter described in detail comprises a generally horizontally disposed load carrying platform 30 of suitable width, a guide frame structure 38 fixed to the bottom surface 33 of the platform and a connecting pin 40 secured to the article carrier member 16 projecting substantially perpendicularly outwardly from the bottom end thereof intermediate the ends of the guide frame structure 38. The load carrying platform 30 is constructed and arranged at its opposite ends to cooperate with like load carrying platforms 30 of immediately adjacent carrier members 16 in the conveyor chain 12 for relative articulating movement, preferably, while maintaining a substantial continuous upper surface; the guide frame structure 38 is constructed and arranged to cooperate both with immediately adjacent carrier members 16 to maintain the horizontal disposition thereof and with the support structure 18 to guide the travel of the conveyor chain 12; and the connecting pin 40 is constructed for releasably interconnecting the load carrying member 16 with the link-type chain 14.

For these purposes, the load carrying platform 30 is generally crescent-shaped having one end shaped to provide a semi-circular convex edge 34 and at its opposite end provided with a complementary semi-circular concave edge 36. On one face 32, the platform 30 of article carrier member 16 is free for support of articles, while on it opposite face 33 the guide frame structure 38 fixed below the associated platform 30 is configured as a generally horseshoe-shaped flange 42 with a pair of spaced, parallel coextensive sides 44 which in this instance, project beyond the concave edge 36 of the platform 30 intermediate the ends thereof with a cover 46 therebetween and serves to support the contiguous convex end of immediately adjacent carrier members 16 in the conveyor chain 12 and maintain the horizontal disposition of like platforms 30. In order to enable the platform 30 to be supported by and run on aligned, coextensive and properly spaced opposed track flanges 56 of the conveyor support structure 18, or other desirable conveyor run-supporting means, the overall width of the guide frame structure 38 is such as to afford sufficient width of the platform 30 at each side thereof to engage slidably with the track flanges 56 of the support structure 18.

The connecting pin 40 which, as indicated, projects outwardly from the opposite bottom end of the article carrier member 16, serves to facilitate simple manipulative coupling assembly of the article carrier members 16 and the link-type chain 14 at respective pivot joints 22 of the chain 14 to effect a reliable interlocked pivotal relationship of the coupled members 16 and 14. To this end, the chain link hollow pin connector 28 is internally cylindrical and defines a coupling socket receptive to the connecting pin 40 of substantially the same diameter so as to afford a freely sliding bearing fit therewith. Desirably, the connecting pin 40 is of a length wherein the distal end portion projects from the hollow pin link connector 28 after coupling, the distal end portion of the connecting pin 40 having a spring-biased ball 48 recessed therein which protrudes an amount sufficient to provide an effective interlock for the coupled connecting pin 40—hollow pin link connector 28 without inhibiting the ability of the connecting pin 40 to freely pivot or rotate relative to the link connector 28. While the protruding spring-biased ball 48 provides an effective interlock for the coupled members, the spring-biased ball 48 may be readily manually depressed within the connecting pin 40 recess for effecting the initial coupling of the connecting pin 40 and chain link connector 28, or when desired, for ready separation of such members.

The support structure 18 of the conveyor system 10 defines a path or course of travel along which the conveyor chain 12 in the form of a train of contiguous article carrier members 16 is transported. Preferably, the path of travel defined by the support structure 18 is in the form of a closed loop or continuous endless circuit, although such a layout is not absolutely essential to effective operation of the conveyor system 10 in the broadest sense. In practice, the support structure 18 usually is mounted on a suitable base (not shown) which supports the conveyor system 10 a suitable distance above the floor depending on the structures associated therewith, e.g. work stations, other conveyors, etc.

The support structure 18 is generally configured to define a longitudinally extending channel or trough 50 located centrally above a base member 52 along the paths of travel of the conveyor system 10. Directly above and fixedly secured upon the base member 52 are a pair of laterally spaced generally vertically disposed guide track structures 54. Guide track structures 54 are preferably, although not necessarily, coextensive with the base member 52, e.g. sections associated with drive sprockets and the like. The uppermost portions of the guide track structures 54 may be formed with substantially horizontally disposed, laterally inwardly extending flanges 56 which are disposed parallel to and separate from each other. Such flanges 56 define elongated side rails and the side limits of the conveyor system 10 path which, as indicated, may curve in any reasonable arrangement. While the various members of the support structure 18 may be fabricated from aluminum and the like and assembled by welding, riveting or other conventional means, metal extrusions configured as shown may be advantageously employed for many applications.

Along the length of flanges 56 are securely mounted channel-shaped longitudinally extending wear strips 58 that may be fabricated from nylon or the like low friction, wear resistant plastic materials by extrusion or other conventional techniques. Such wear strips 58 are adapted to overlie the top and bottom surfaces 55 and 57, respectively, and the inner edges 59 of the flanges 56 to provide low-friction, self-lubricating running surfaces 60 for the outer edges of the platform 30 portion of article carrying members 16 as well as providing guide means 62 cooperating with the opposing parallel coextensive sides 44 of the guide frame structure 38 as the conveyor chain 12 travels along the path defined by the support structure 18. The channel configuration 50 of the support structure 18 serves as an unimpeding chainway for the link-type chain 14 in the spacing between drive sprockets 20 and the like.

A particularly noteworthy feature of the above described construction resides in the fact that it is a compact and low-profile design, thereby enabling it to be used in table top applications, as spur conveyors and in other configurations making possible the most effective use of the available space. In this connection, the conveyor chains 12 of the invention are able to negotiate turns or bends of very short radii with ease, thus making possible the use of drive sprockets 20 and the like of small diameter; the conveyor chain 12 can be readily assembled or disassembled and/or individual article carrier members 16 readily replaced when desired; articles may be conveniently placed upon and removed from the conveyor platforms 30 traveling therealong; and the conveyor chains 12 travels smoothly and rapidly without the need for external lubrication.

Figure 10:
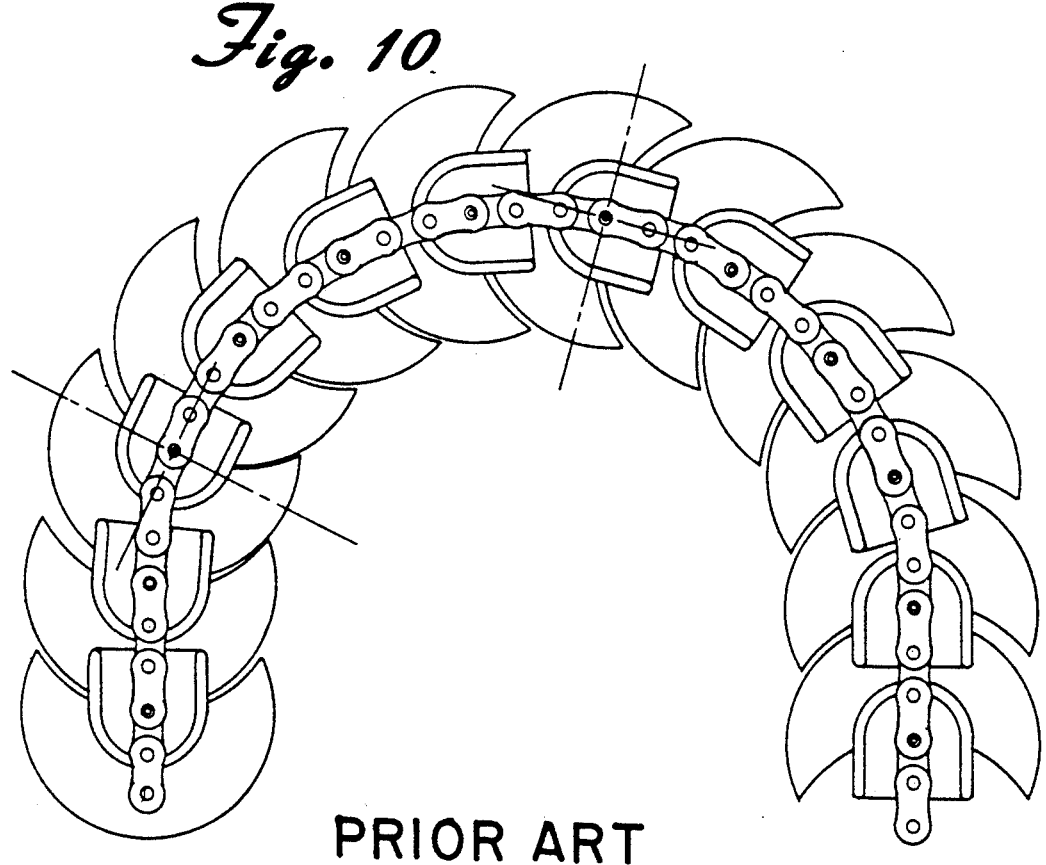
FIG. 10 is a bottom view of a conveyor chain with load carrying members according to the prior art.
Figure 11:
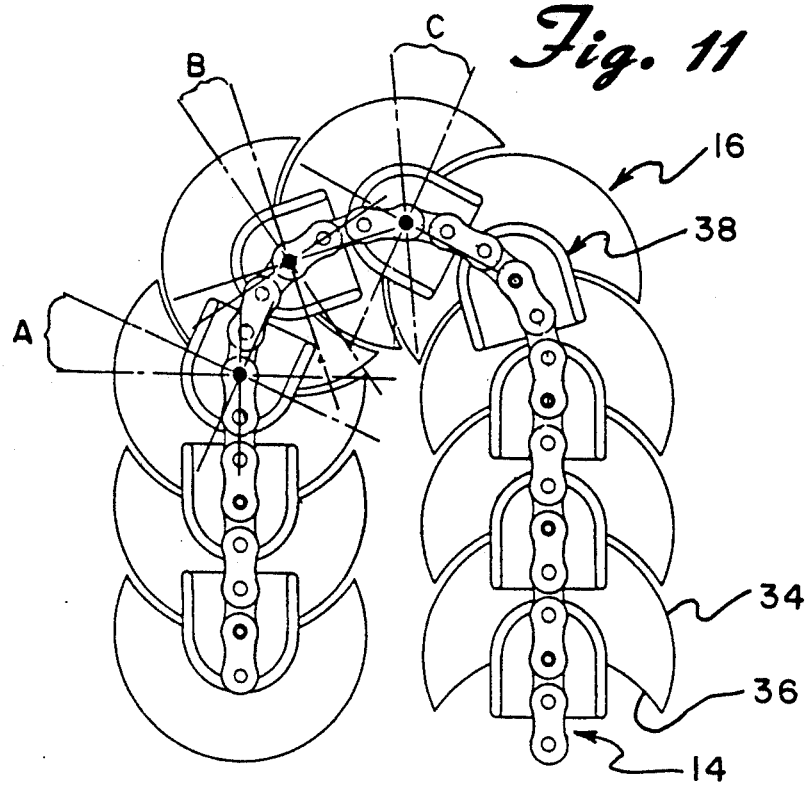
FIG. 11 is a bottom view of a conveyor chain comprising a conventional hollow pin link chain having pivotally mounted thereon support members in accordance with the invention.

The surprisingly enhanced ability of the conveyor chains 12 of the invention to negotiate turns of very short radii including sharp bends and turn-arounds, with ease while maintaining a substantially continuous load carrying surface is best illustrated by referring to FIGS. 10 and 11. In FIG. 10 there is shown a conveyor chain having a plurality of adjacently oriented crescent-shaped load carrying members generally known in the prior art which are directly secured to the chain link connectors at respective chain pivot joints and in FIG. 11 there is shown a conveyor chain 12 of the present invention having a plurality of load carrying members 16 with platforms 30 of generally similar shape to those shown in FIG. 10 which are pivotally and releasably coupled to the chain link connectors 28 at respective pivot joints 22 of the chain 14 as herein described. As a result of the load carrying members 16 of the invention being capable of pivoting relative to the chain link connectors 28 of the chain 14 when the conveyor chain 12 is following a curved course as shown in FIG. 11 by the angles A, B and C, the much sharper radius of curvature that the conveyor chain 12 of the invention may traverse is made evident when compared to conveyors of the prior art where the load carrying members simply follow the course of the pivoting chain links, as shown in FIG. 10. Thus, the novel conveyor chain construction herein described can negotiate sharp turns and turn-arounds with significantly sharper radii than previously possible and conveyor systems may, for example, be configured with sprockets or the like drive means of very small diameter.

Also noteworthy in the above described construction is the fact that prefabricated subassemblies or modules which can be conveniently assembled and disassembled for setting up the conveyor pathway, or for altering, revising or maintenance thereof would be possible.

Referring now to FIGS. 6 to 9, there is shown an article carrying member 16 in accordance with the invention which comprises, as indicated, a load carrying platform 30 having a generally planar load carrying upper face 32, a guide frame structure 38 extending from the face 33 of the platform 30 opposite the upper face 32, and a connecting pin 40 projecting substantially perpendicularly outwardly from the load carrying member 16 within the area defined by the guide frame structure 38 and intermediate the ends thereof.

The platform 30 is generally crescent-shaped in plan view, constructed and arranged at its opposite ends to cooperate with like platforms 30 of immediately adjacent carrying members 16 in a chain conveyor 12 for relative articulated movements. For this purpose, the platform 30 has one arcuate-shaped convex edge 34 which lies substantially along the circumference of a circle about the center of connecting pin 40. At its opposite end, the platform 30 is provided with an arcuate-shaped concave edge 36 which lies substantially along the circumference of a circle about the center of the connecting pin 40 of a next succeeding article carrying member 16 (see FIGS. 1 and 2), which is also the center of the circle defining the convex edge 34 of that next succeeding article carrying member 16. As a result, the platforms 30 have a complementary configuration and provide a substantially flat, continuous article supporting surface when such members are assembled in a conveyor chain 12 in the manner illustrated in FIG. 1. Moreover, with the convex and concave edges 34 and 36 of the platform 30 blended in at their ends as shown, each platform 30 can turn with respect to the next adjacent platform 30 when traversing a curved course without substantially reducing the overall area of the article carrying surfaces or with gaps opening between them.

As indicated, the article carrying member 16 comprises a generally horseshoe shaped guide frame structure 38 which is disposed below and integral with the platform 30 substantially equidistant from the opposite sides thereof, having a pair of spaced, parallel coextensive sides 44 which project beyond the concave edge 36 of the platform, a flat cover member 46 extending between the sides 44 projecting beyond the edge 36 of platform 30 and a web member 47 which bridges the coextensive sides 44 intermediate the opposite ends of the frame structure 38. The flat cover member 46 is adapted to support the contiguous complimentary convex end of an immediately adjacent like platform 30 in a conveyor chain 12 to assist in maintaining the horizontal disposition of the platform while the coextensive parallel sides 44 of the guide frame structure 38 are adapted to cooperate with the guide means 62 of an associated support structure 18. The web member 47 which bridges the coextensive sides 44 intermediate the opposite ends of the frame structure 38, includes a pin receptor 41 integral therewith generally equidistant from the ends of the web member 47. The pin receptor 41 portion of the web member 47 which is at the center of the circle defining the arcuate convex edge 34 of the platform 30, extends below the cover plate member 46 from a point generally tangent to the arcuate concave edge 36 of the platform 30 equidistant from the ends thereof.

The article carrying member 16, as seen in FIGS. 6 to 9, may be fabricated of any suitable strong, rigid plastic material such as polycarbonate, nylon or the like by conventional molding techniques with the platform 30 and guide frame structure 38 elements together with the connecting pin 40 being integrally formed as shown. Alternatively, the platform 30 and guide frame structure 38 may be separately fabricated of suitable metals such as aluminum or stainless steel, plywood, compositions flake board or the like and then assembled by conventional means.

While in a preferred embodiment the configuration of the platform 30 is crescent shaped and the guide frame structure 38 is horseshoe shaped as herein shown, it would be evident that the configuration thereof may be varied according to the particular application e.g., the size and course of the conveyor system and the conveyor chain, the weight of articles to be transported, the type of support structure employed and like factors.

Connecting pin 40 which, as indicated, projects outwardly from the load carrying member 16 and serves to facilitate coupling assembly of the article carrier member 16 and a link-type chain 14, is configured to effect a reliable interlocked pivotal relationship with the chain, which coupling assembly, however, can be readily separated when desired e.g., to replace the load carrying member 16 or revise the configuration of the conveyor chain 12. The connecting pin 40 is secured at one end to the load carrying member 16 by virtue of being retained within the pin receptor 41 element of the web member 47 portion of the guide frame structure 38. The distal end of the connecting pin 40 has a spring-biased ball 48 recessed therein which may be readily manually depressed within the recess for insertion of the pin shaft through a mating part but protrudes from the pin shaft an amount sufficient to provide an effective interlock with a coupled member. Desirably, the connecting pin 40 is of a diameter which would permit the insertion thereof through a link connector for a link-type chain 14, such as an internally cylindrical hollow pin link connector 28, which is of substantially the same diameter and defines a coupling socket receptive of the connecting pin 40 so as to afford a freely sliding bearing fit therewith, and is of a length wherein the distal end portion thereof projects from link connector 28 after coupling an amount sufficient for the recessed spring-biased ball 48 to provide an effective interlock therefore.

From the foregoing it will be apparent that there has been provided by the present invention highly versatile conveyor system, conveyor chain and load carrier member constructions in which conveyors which are able to negotiate turns, sharp curves and turn-arounds of small radius with ease while presenting a substantially continuous load carrying surface. The conveyor chains may employ conventional chains which can be readily converted to the desired conveyor system by the simple and ready incorporation of load carrying members. Moreover, the load carrying members of the invention can not only be used to form the flight of a conveyor chain but can be readily removed from the conveyor chain for the purpose of maintenance or revision of the system.

Having thus described the invention in relation to the drawings hereof, it will be clear that modifications could be made in the preferred embodiment without departing from the spirit of the invention. Accordingly, it is not intended that the words used to describe the invention be limiting thereof nor should the drawings be considered so. It is intended that the invention be limited only by the scope of the appended claims.

What is claimed is:

1. A conveyor system suitable for use over linear and curved paths of travel including sharp bends of short radius comprising:
    a) a link-type chain having pivot connecting means for interconnecting the links thereof a drive means associated therewith, said pivot connecting means for interconnecting the links of said chain being internally cylindrical hollow pin connectors which define a coupling socket with which separable connecting means of article carrier members are rotatably connectable;
    b) a plurality of separable article carrier members in adjacent orientation releasably and pivotally interconnected with said link-type chain at respective pivot connecting means of said link-type chain to form a train of consecutive article carrier members having a substantially continuous planar upper face, each of said carrier members comprising only separable connecting pin means integral therewith for releasably and pivotally interconnecting said article carrier member with said hollow pin pivot connectors of said link-type chain, and each of said carrier members having a substantially planar upper face with one edge thereof formed in a convex circular arc and an opposed edge formed in a concave circular arc, wherein the convex edge of one carrier member in said train is in contiguous relation to the concave edge of an adjacently oriented carrier member, said contiguous relation of adjacent carrier members and the substantially continuous upper face presented thereby being maintained while said train of carrier members follows a curved course; and
    c) means for supporting said carrier members and for guiding the path of travel of said train of carrier members.

2. The conveyor system according to claim 1, wherein each of said carrier members comprises support means for maintaining immediately adjacent carriers members in a substantially horizontal plane.

3. The conveyor system according to claim 2, wherein said means for guiding the path of travel of said train of carrier member includes wear strip means to provide low-friction, self-lubricating running surfaces for said article carrier members.

4. A conveyor chain having a substantially continuous upper face which is adaptable to follow with ease linear and curved paths of travel including sharp bends and turn-arounds of short radius comprising a train of a plurality of separable adjacently oriented crescent shaped load carrying members with a planar upper face pivotally and releasably interconnected with respective pivot joints of an endless link-type chain having a pivotal connector means for the links thereof, wherein said pivotal connector means for the links of said link-type chain is an internally cylindrical hollow pin connector which defines a coupling socket with which a connecting pin means is releasably and pivotally connectable, each of said load carrying members having only releasable connecting pin means with spring-biased ball means recessed within the distal end thereof for removably interconnecting said carrier members with respective pivotal connector means of said link-type chain and being constructed at its opposite ends to articulatably cooperate with immediately adjacent load carrying members.

5. A load carrier member suitable to be releasably interconnected with a link-type conveyor chain for a conveyor system adapted to convey a train of said carrier members along an irregular path, said load carrier member comprising platform means having a planar face which is constructed at its opposite ends to cooperate with immediately adjacent load carrying members in a continuous train thereof, guide means extending from a face of said platform means opposite said planar face intermediate the ends thereof, and connecting pin means projecting substantially perpendicularly outwardly from a face of said load carrier member opposite the planar face of said platform means within the area defined by said guide means, said connecting pin means including spring-biased ball means recessed within the distal end thereof.

6. The load carrier member according to claim 5, wherein said guide means is a horseshoe configured guide frame structure disposed equidistant from opposite ends of said platform means having a pair of spaced, parallel coextensive sides.

7. The load carrier member according to claim 6, wherein said coextensive parallel sides project beyond an end of said platform means adapted to cooperate with immediately adjacent load carrier members in a chain thereof to provide support means for an adjacent carrier member to maintain the horizontal disposition thereof.

* * * * *